NATHAN W. ARAM
INVENTOR.
BY Francis W. Crotty
HIS ATTORNEY

Dec. 30, 1952 N. W. ARAM 2,623,941

SUBSCRIPTION TELEVISION SYSTEM

Filed June 23, 1950 3 Sheets-Sheet 2

NATHAN W ARAM
*INVENTOR.*

BY Francis W. Crotty

*HIS ATTORNEY*

Dec. 30, 1952 N. W. ARAM 2,623,941

SUBSCRIPTION TELEVISION SYSTEM

Filed June 23, 1950 3 Sheets-Sheet 3

NATHAN W. ARAM
INVENTOR.

BY Francis W. Crotty
HIS ATTORNEY

Patented Dec. 30, 1952 2,623,941

UNITED STATES PATENT OFFICE 2,623,941

SUBSCRIPTION TELEVISION SYSTEM

Nathan W. Aram, Park Ridge, Ill., assignor to Zenith Radio Corporation, a corporation of Illinois Application June 23, 1950, Serial No. 169,820

3 Claims. (Cl. 178—5.1)

This invention relates to subscription television systems of the type in which a television signal is transmitted in coded form over a first channel, and a key signal indicating the coding schedule of the television signal is disseminated to subscriber receivers over a second channel, preferably a line circuit.

Copending Application Serial No. 41,081 entitled "Color Television System," filed July 28, 1948, now abandoned, in the name of Nathan W. Aram and assigned to the present assignee, discloses a type of cathode-ray tube which includes a target electrode comprised of a plurality of discrete elements each having separate surfaces inclined to the plane of the target to form at least two distinct scanning areas. This type of cathode-ray tube has means associated therewith for effecting sequential scansion of the first and second scanning areas.

It is contemplated in the present invention to provide a subscription-type television system that utilizes a cathode-ray tube that may be similar in some respects to the type of tube disclosed in the above-mentioned copending application or which may utilize other types of cathode-ray tubes having a target with a plurality of distinct scanning areas. In accordance with the invention an optical system is provided at the subscription television transmitter for projecting an image of an object to be telecast on a first of the scanning areas of the tube target in a first mode, and on a second of the scanning areas in a distinctly different and incompatible mode. That is, the second-mode projected image may have a left-right inversion, a top-bottom inversion or some other altered characteristic relative to the first-mode image. Coding apparatus is coupled to the tube to direct the cathode-ray beam therein from the first scanning area of the target to the second scanning area during spaced operating intervals to provide sequential scansion of these areas and thereby code the video signal generated by the tube. Moreover, a key-signal generator may be provided for developing a key signal indicating the occurrence of the spaced intervals, the key signal being transmitted to subscriber receivers over a line circuit for purposes to be described.

As used in this description and in the appended claims, the expression "incompatible modes" is intended to define two or more modes of image translation of such individual characteristics that an observer viewing a succession or superposition of the several modes cannot derive therefrom any intelligible image information.

It is, accordingly, an object of the invention to provide an improved and simplified subscription television system in which a television signal is transmitted in coded form over a first channel and a key signal indicating the coding schedule of the television signal is transmitted over a second channel.

The features of this invention which are believed to be new are set forth with particularity in the appended claims. The invention itself, however, together with further objects and advantages thereof may best be understood by reference to the following description when taken in conjunction with the accompanying drawings, in which:

Figure 1:
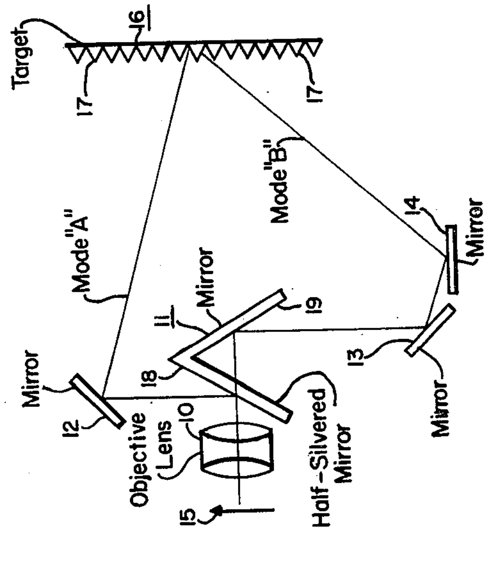
Figure 1 is a schematic representation of the present invention.

The optical system shown schematically in Figure 1 includes an objective lens 10, a mirror arrangement 11, a further mirror 12 and a mirror arrangement 13, 14. This optical system acts to project an image of object 15 on target 16. The target is comprised of a plurality of discrete elements 17 each having separate surfaces inclined to the plane of the target to form two distinct image or scanning areas. The optical system acts to project a mode "A" image of object 15 on one of these areas, this being accomplished by means of lens 10, surface 18 of mirror 11, and mirror 12. Surface 18 is half-silvered in accordance with known practice so that a portion of the light rays incident thereon continues through this surface and is reflected by surface 19. An image of object 15 is projected in mode "B" on the other image area of target 16 by means of lens 10, surface 19 and mirrors 13, 14. The additional mirror 14 in the mode "B" light path causes a left-right inversion of the image projected by this path relative to the image projected by the mode "A" light path. In this manner, one of the image areas of target 16 has an image of the object to be broadcast projected thereon in mode "A," and the other area has an image of the object projected thereon in mode "B" which is distinctly different from mode "A."

Figure 2:
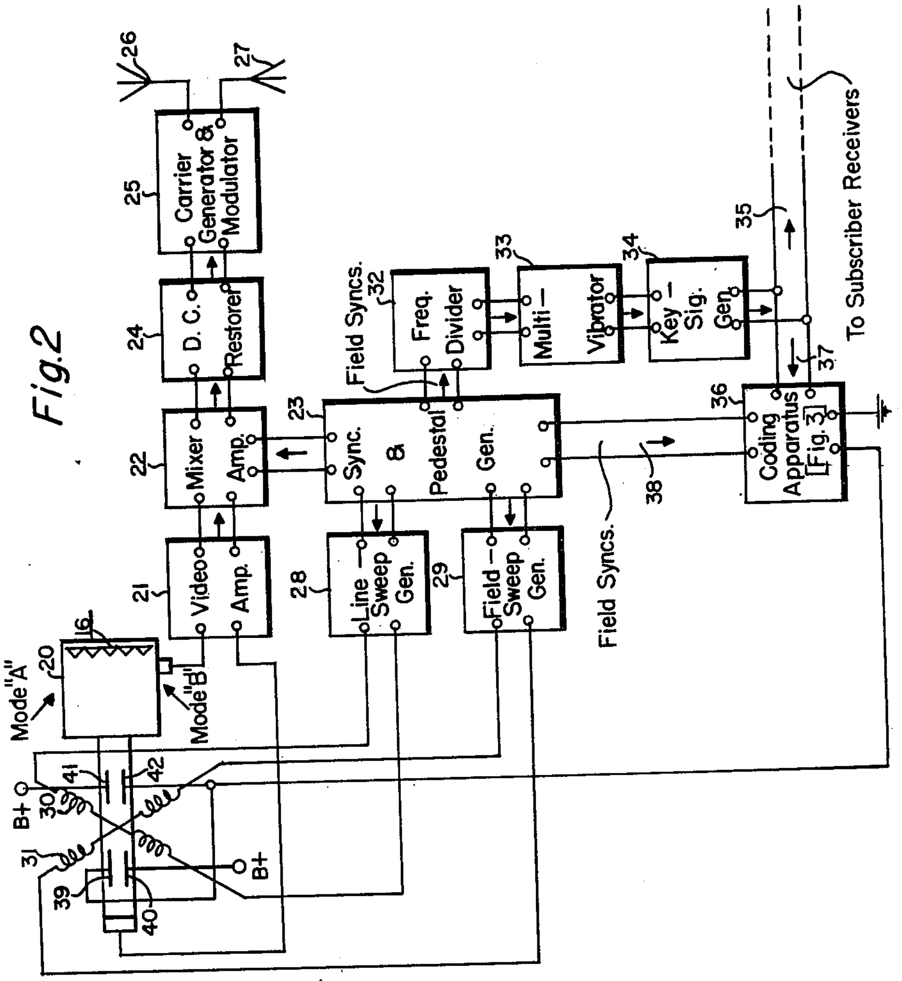
Figure 2 represents a subscription television transmitter constructed in accordance with the invention.

The transmitter of Figure 2 may utilize a picture-converting device 20 having a target element of the type shown in Figure 1 or, as previously mentioned, any other suitable type of picture-converting device having a target with more than one distinct image area. Picture-converting device 20, of which a top view is shown, is connected to a video amplifier 21 which, in turn, is connected to a mixer amplifier 22, the mixer being coupled to a synchronizing-signal and pedestal generator 23. Output terminals of mixer 22 are connected to a direct-current restorer stage 24, and stage 24 is coupled to a usual carrier-wave generator and modulator stage 25 the output terminals of which connect to an appropriate antenna circuit 26, 27.

Generator 23 is connected to a line-sweep generator 28 and field-sweep generator 29 which are coupled respectively to line-scanning elements 30 and field-scanning elements 31 associated with device 20. Generator 23 is further connected to a frequency divider 32 which may be of the random-division type such as disclosed in copending application Serial No. 32,457, filed June 11, 1948, issued March 11, 1952, as Patent 2,588,413, in the name of Erwin M. Roschke, entitled "Random Frequency Divider" and assigned to the present assignee. The output terminals of frequency divider 32 are connected to a multivibrator 33 of the well-known "Eccles-Jordan" type. That is, multivibrator 33 has two stable operating conditions and may be triggered from one to the other by an applied pulse of a predetermined polarity, and returned to the first operating condition by a succeeding pulse of the same polarity. Multivibrator 33 is connected to a key-signal generator 34 having output terminals coupled to a line circuit 35 extending to various subscriber receivers. Generator 34 is further connected to a coding apparatus 36 by way of leads 37, the coding apparatus being connected to generator 23 by way of leads 38. The output terminals of coding apparatus 36 are coupled to auxiliary deflection or control elements 39, 40 and 41, 42 associated with device 20. Control elements 40, 41 may be connected to the positive terminal B+ of a source of unidirectional potential to provide electrostatic fields between electrodes 39, 40 and 41, 42 of such intensity that for the duration of pulses generated by coding apparatus 36 the cathode-ray beam is directed to one image or scanning area of target 16, and during intervals between such pulses the cathode-ray beam is directed to the other image area. This action of the cathode-ray beam is fully discussed in the aforementioned Aram copending application. Briefly, the deflecting fields established by these control elements in the presence of a pulse from unit 36 define a trajectory for the electrons of the scanning beam which terminates on one image area of the target elements 17. The deflecting fields are modified, however, in the absence of pulses from unit 36 so that the electron trajectory terminates on the alternate image area of elements 17.

A mode "A" image of the object to be scanned by device 20 may be projected onto one scanning area of target 16 by an optical system such as that shown in Figure 1, which may also serve to project a mode "B" image of this object onto the other scanning area of the target. In a manner to be more completely described, the cathode-ray beam in device 20 is controlled to scan the two image areas in accordance with a coding schedule, and the video signal generated by the device represents the mode "A" image during intervals when the beam scans the first image area, but it represents the mode "B" image during other intervals when the beam scans the second image area.

The video signal generated by device 20 is amplified in video amplifier 21 and mixed in mixer 22 with line- and field-synchronizing pulses appropriately produced and pedestalled by generator 23. The composite signal appearing at the output terminals of mixer 22 is properly adjusted as to background level in restorer stage 24, modulated on a suitable carrier-wave in unit 25 and radiated by means of antenna circuit 26, 27. Generator 23 supplies line- and field-synchronizing pulses respectively to generators 28, 29 to control the operation of these generators and, hence, the line and field scansion of target 16.

Generator 23 also supplies field-synchronizing pulses to frequency divider 32 wherein they are frequency divided and utilized to trigger multivibrator 33. The multivibrator generates pulses having leading and trailing edges determined by successive pulses derived from divider 32. The pulse components of a given polarity from multivibrator 33 are utilized to control key-signal generator 34 which produces a burst of sine wave on line circuit 35 in response to each such pulse from multivibrator 33. The bursts of sine wave are supplied to coding apparatus 36 by way of leads 37, and the coding apparatus responds to the field-synchronizing pulse on leads 38 following the initiation and the field-synchronizing pulse following the termination of each burst of key signal to supply a pulse to control electrodes 39—42. As previously explained, each pulse applied to elements 39—42 modifies the deflecting fields to direct the cathode-ray beam of device 20 from one image area to the other image area of target 16 for the duration of each pulse from the coding apparatus.

During what may be termed mode "A" operation of the transmitter, namely, during the intervals between pulses from coding apparatus 36, the cathode-ray beam in device 20 is directed to the first image area of target 16 due to the positive bias on electrodes 40, 41 and device 20 generates a video signal representing the mode "A" image of the object being televised. However, during spaced intervals constituting what may be termed mode "B" operation of the transmitter, coding apparatus 36 supplies pulses to electrodes 39—42 which cause the beam to scan the second image area of target 16 so that device 20 develops a video signal representing the mode "B" image of the object being televised. As previously pointed out, the mode "B" image is incompatible with the mode "A" image and may represent a side-to-side inversion with respect to the mode "A" image, although a top-to-bottom inversion or any other distinct alteration in an image characteristic may be employed.

The deflection of the cathode-ray beam of device 20 from the first to the second image area of target 16 is determined by the bursts of key signal generated by key-signal generator 34 and transmitted to subscriber receivers over a line circuit 35. These bursts are each initiated and terminated during field-retrace intervals by the action of frequency divider 32 and multivibrator 33. The coding apparatus 36 responds to the joint application of each burst of key signal and field-synchronizing pulses to supply pulses to electrodes 39—42. Each of these latter pulses has a leading edge occurring during the field-retrace interval following the initiation of a corresponding key-signal burst on line circuit 35 and a trailing edge occurring during the field-retrace interval following the termination of the key-signal burst. In this manner, each burst of key signal on line circuit 25 indicates to the subscriber receivers the occurrence of the spaced intervals during which the scansion of target 16 is altered from mode "A" to mode "B." Moreover, due to the action of the coding apparatus 36, each key-signal burst precedes, by approximately a field-trace interval, the corresponding pulse produced by the coding apparatus. In this manner, as will be more fully discussed hereinafter, slight time delays of the key-signal bursts in line circuit 35 may be tolerated with no adverse effect on the proper operation of the subscriber receivers. In addition, due to the action of the coding apparatus 36, changes between modes are made to occur during field-retrace intervals and any distortion that might arise should they occur during trace intervals is thereby precluded.

It is within the scope of the invention that the target 16 be composed of three-sided elements arranged to form three scanning areas and the images be projected thereon in three distinct modes. With such an arrangement, the cathode-ray beam is controlled to scan sequentially the three scanning areas in accordance with a coding schedule. Furthermore, the single cathode-ray beam source and control elements 39—42 may be replaced by a plurality of sources for developing beams directed to the respective scanning areas. With this latter arrangement, the various sources may be controlled by coding apparatus 36 to provide sequential scansion of the several image areas.

Figure 3:
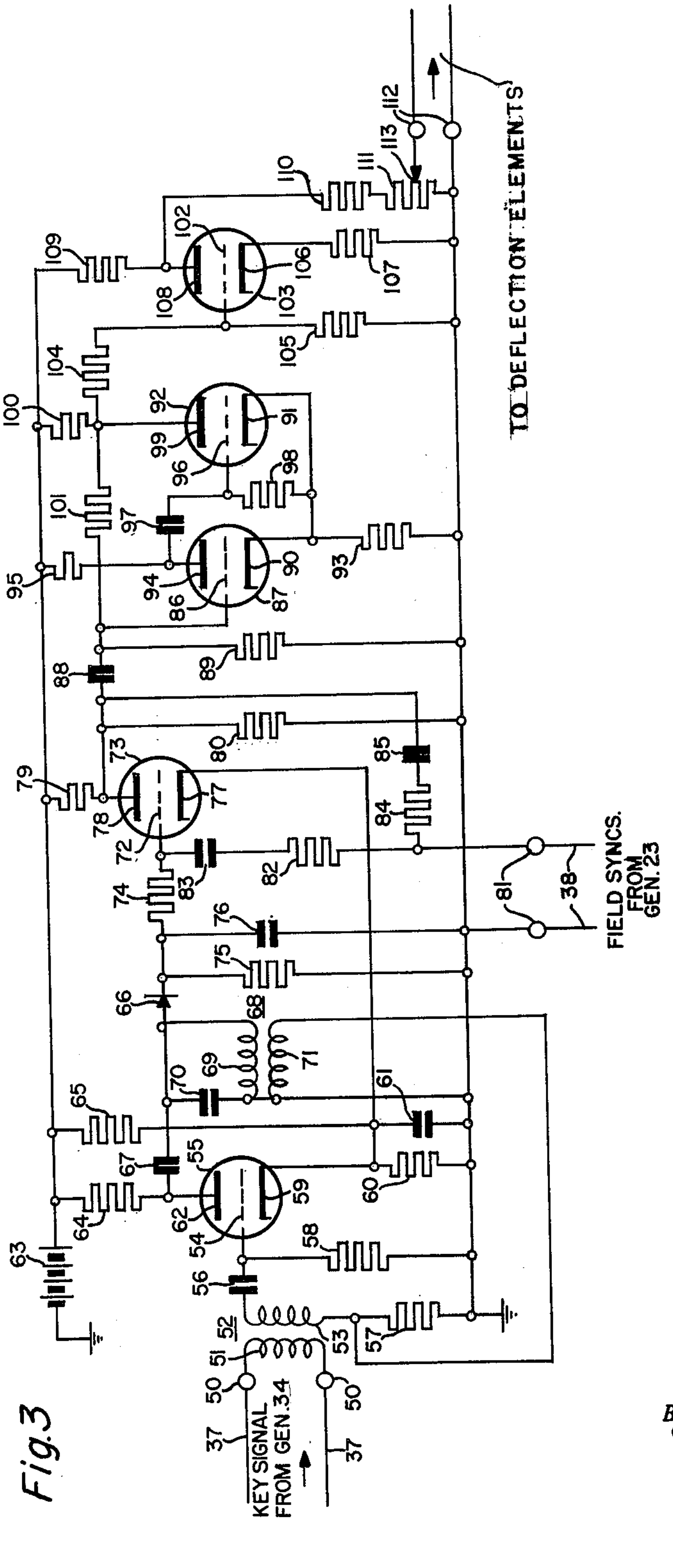
Figure 3 is a detailed representation of one of the components of the transmitter of Figure 2, and, Figure 4 illustrates a subscription type television receiver for utilizing the subscription signal.

The coding apparatus 36, shown in detail in Figure 3, includes a pair of input terminals 50 which are connected to key-signal generator 34 by way of leads 37. Terminals 50 are connected to a primary winding 51 of a transformer 52, the secondary winding 53 being coupled to a control electrode 54 of an electron-discharge device 55 through a coupling capacitor 56 and to ground through a resistor 57. Control electrode 54 is connected to ground through a grid-leak resistor 58 and cathode 59 is connected to ground through a resistor 60 shunted by a capacitor 61. Anode 62 of device 55 is connected to the positive terminal of a source of unidirectional potential 63 through a load resistor 64, and cathode 59 is connected to this terminal through a resistor 65. The device 55 is an amplifier for the key signal received from generator 34, and because of the cathode bias provided by the potentiometer arrangement of resistors 60, 65 this amplifier responds only when the amplitude of the key signal exceeds a preselected threshold value.

Anode 62 is coupled to a rectifier device 66 through a coupling capacitor 67. The amplifier is made re-generative by means of a transformer 68. The primary winding 69 of this transformer has one side connected to the junction of capacitor 67 and rectifier 66 and the other coupled to this junction through a capacitor 70. The capacitor 70 and winding 69 form a resonant circuit tuned to the frequency of the sinusoidal energy in the key-signal bursts so that the amplifier may respond solely to this frequency. The secondary winding 71 of transformer 68 has one side connected to the primary winding and to ground and the other connected to the junction of winding 53 and resistor 57. The rectifier 66 is connected to the control electrode 72 of an electron-discharge device 73 through a resistor 74, and to ground through a resistor 75 shunted by a capacitor 76. Cathode 77 of device 73 is directly connected to cathode 59 of device 55, and anode 78 is connected to the positive terminal of source 63 through a load resistor 79 and to ground through a resistor 80.

The coding apparatus has a second pair of input terminals 81 which are connected to generator 23 by leads 38. One of the terminals 81 is connected to ground and the other is coupled to control electrode 72 of device 73 through series-connected resistor 82 and capacitor 83. The ungrounded terminal 81 is also coupled to anode 78 of device 73 through series-connected resistor 84 and capacitor 85.

The anode 78 is coupled to control electrode 86 of an electron-discharge device 87 through a coupling capacitor 88, and this control electrode is connected to ground through a grid-leak resistor 89. Cathode 90 of device 87 is directly connected to cathode 91 of an electron-discharge device 92, these cathodes being connected to ground through a common resistor 93. Anode 94 of device 87 is connected to the positive terminal of source 63 through a resistor 95 and to the control electrode 96 of device 92 through a capacitor 97, the control electrode being connected to cathodes 90, 91 through a resistor 98. Anode 99 of device 92 is connected to the positive terminal of source 63 through a resistor 100 and to control electrode 86 of device 87 through a resistor 101. Devices 87 and 92 are connected to form a "single shot" multivibrator, and may be triggered from one stable operating condition to another by pulses of one polarity and returned to the first operating condition by pulses of a second polarity. The construction and operation of this type of multivibrator circuit are well-known in the art.

Anode 99 is connected to control electrode 102 of an electron-discharge device 103 through a limiting resistor 104, the control electrode being connected to ground through a resistor 105. Cathode 106 of device 103 is connected to ground through a cathode resistor 107, and anode 108 is connected to the positive terminal of source 63 through a resistor 109 and to ground through series-connected resistors 110, 111. The device 103 acts as a phase inverter and amplifier for the pulses from the multivibrator and supplies these pulses to output terminals 112 with an amplitude that may be adjusted by a movable tap 113 on resistor 111. The output terminals 112 are connected to deflection elements 39—42 associated with device 20 of Figure 1.

Positive - polarity field - synchronizing pulses from generator 23 are impressed across terminals 81 and are supplied to control electrode 72 through network 82, 83 and to the junction of anode 78 and resistor 80 through network 84, 85. These field-synchronizing pulses comprise a single broad pulse indicating each field-retrace interval such as are applied to field-sweep generator 29, as opposed to the serrated field-synchronizing pulses supplied to mixer 22 for inclusion in the radiated television signal. The bursts of key signal generated by key-signal generator 34 are impressed across terminals 50 and amplified in device 55. The amplified key-signal bursts are rectified by device 66 and supplied to control electrode 72 with negative polarity, and when the rectified signal has maximum amplitude device 73 is rendered non-conductive. In this manner, during the intervals between bursts of key signal, the field-synchronizing pulses are amplified by device 73 and applied to control electrode 86 of device 87 with negative polarity. Concurrently, the field-synchronizing pulses are applied directly to control electrode 86 by way of network 84, 85 but with positive polarity. The amplification of device 73 is, preferably, made such that under these conditions the resultant pulse applied to control 86 has negative polarity and an amplitude substantially equal to that of the field-synchronizing pulses as applied to terminals 81. However, during the occurrence of each burst of key signal, and when the rectified burst has its maximum negative value, the field-synchronizing pulses are supplied to control electrode 86 only by way of network 84, 85 and with positive polarity. Therefore, the pulses applied to control electrode 86 have negative polarity until shortly after the occurence of each burst of key signal, at which time the succeeding pulses applied to electrode 86 have positive polarity. Likewise, the pulses applied to control electrode 86 following the termination of each key-signal burst again have negative polarity.

The multivibrator circuit of devices 87, 92 is triggered from one operating condition to the other by the first positive-polarity field-synchronizing pulse succeeding the initiation of each key-signal burst and is returned to its first operating condition by the first negative-polarity field-synchronizing pulse following the termination of each burst. The multivibrator, therefore, supplies a signal of rectangular waveform to control electrode 102 of device 103, this signal having a maximum value when the multivibrator is in its second operating condition and a minimum value when the multivibrator is in its first operating condition.

Device 103 amplifies the signal from the multivibrator and applies an output signal of rectangular waveform to terminals 112. This output signal is impressed on deflection elements 39—42 associated with device 20, and tap 113 of potentiometer 111 may be adjusted so that the cathode-ray beam of device 20 is directed to one of the areas of target 16 in the intervals of maximum amplitude of the rectangular output signal and to the other during intervals of minimum amplitude of this signal.

It is convenient to refer to the amplitude change of the output signal from device 103 between minimum to maximum and back to minimum as a pulse and to consider the pulse-modulated signal from this device as comprising a series of time-spaced pulses of a given polarity delivered to elements 39—42. This simplified characterization has been adopted in the foregoing description.

Figure 4:
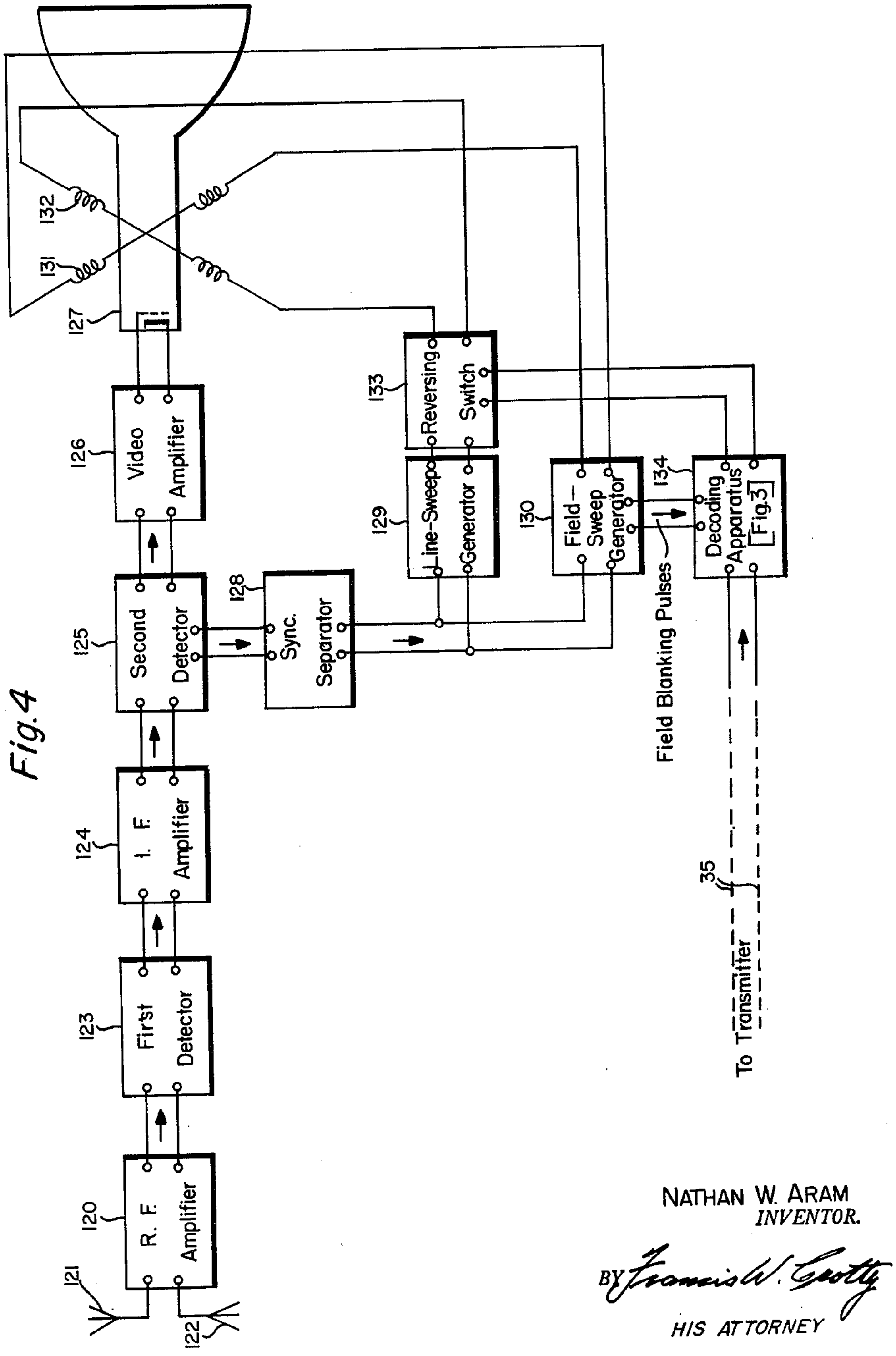

Reference is now made to the receiver of Figure 4 which includes a radio-frequency amplifier 120 coupled to a suitable antenna circuit 121, 122. The output terminals of radio-frequency amplifier 120 are coupled to a first detector 123 which, in turn, is coupled to an intermediate-frequency amplifier 124 of any desired number of stages. The output terminals of intermediate-frequency amplifier 124 are connected to a second detector 125, and the second detector is coupled to a video amplifier 126 of one or more stages. The output terminals of video amplifier 126 are connected to the input electrodes of an image-reproducing device 127 to control the intensity of the cathode-ray beam therein in well-known fashion.

The second detector 125 is further coupled to a synchronizing-signal separator 128 which, in turn, is connected to a line-sweep generator 129 and field-sweep generator 130. Field-sweep generator 130 is connected to the field-deflection elements 131 of device 127, and line-sweep generator 129 is connected to the line-deflection elements 132 of device 127 through a reversing switch 133. Reversing switch 133 may be of the type disclosed in copending application Serial No. 30,067, filed May 29, 1948, in the name of Pierce E. Reeves, entitled "Subscriber Television System" and assigned to the present assignee. That is, this reversing switch may be a simple mechanical structure which upon energization of a solenoid therein reverses the connection between its input and output terminals, or it may take the form of any suitable well known electronic circuit. The receiver also includes decoding apparatus 134, essentially the same as the apparatus described in conjunction with Figure 3, and which includes a pair of input terminals connected to line circuit 35 extending to the transmitter of Figure 1. The decoding apparatus includes further input terminals connected to field-sweep generator 130 to derive field-blanking pulses therefrom, and output terminals connected to reversing switch 133.

The transmitter radiates a coded television signal which includes video components representing a broadcast object in mode "A" during certain intervals and in mode "B" during interposed intervals, the object being represented in mode "B" with a left-to-right inversion relative to mode "A." To enable a receiver properly to reproduce an image of the object, it is necessary that the line scansion be reversed in a compensating manner and in time-coincidence with mode changes in the received signal. This is accomplished by the receiver of Figure 4. The television signal is intercepted by antenna circuit 121, 122 and amplified in radio-frequency amplifier 120. The amplified radio-frequency signal is heterodyned to the selected intermediate frequency of the receiver in first detector 123, and the resulting intermediate-frequency signal is amplified in intermediate-frequency amplifier 124. The intermediate-frequency signal from amplifier 124 is detected in second detector 125 to produce a composite video signal which is amplified in amplifier 126 and impressed upon the input electrodes of device 127.

The synchronizing components of the received signal are separated therefrom in synchronizing-signal separator 128 and utilized to control the operation of sweep generators 129 and 130. As previously pointed out, the times of occurrence of the spaced intervals during which the operation of the transmitter is altered from mode "A" to mode "B" is indicated to the receiver by bursts of key signal on line circuit 35. The decoding apparatus, which operates in a generally similar fashion to unit 36 of Figure 1, supplies a pulse to reversing switch 133 corresponding to each burst of key signal but initiated and terminated in the field-retrace interval following the initiation and termination of each such burst. In this manner, the actuation of reversing switch 133 occurs during the field-retrace intervals following the initiation and termination of each key-signal burst and, therefore, in time coincidence with mode changes at the transmitter regardless of slight time delays which the key-signal bursts may experience in line circuit 35 since the mode changes at the transmitter also occur during the field-retrace intervals following the initiation and termination of each key-signal burst.

It is apparent that should the mode "B" operation of the transmitter represent a top-to-bottom inversion of the transmitted image relative to mode "A", the reversing switch 133 would be placed in the field-scanning circuit. Moreover, when so desired, the receiver may be constructed in a manner similar to the transmitter of Figure 1. That is, reproducing device 127 may include a target having two distinct scanning areas and deflection elements for directing the beam sequentially to the two areas. Decoding apparatus 134 may be utilized to energize the deflection elements in a manner similar to that of the transmitter, and a similar optical system including elements 12, 13 and 14 of Figure 1 be provided so that the images sequentially reproduced on the two areas may be combined in registration for viewing.

The invention provides, therefore, an improved subscription television system in which a transmitted television signal is coded for subscription purposes by the relatively simple expedient of directing images of an object in different modes on distinct scanning areas of the transmitter picture tube, and directing the scansion of the tube to the various areas in accordance with a prescribed coding schedule.

While a particular embodiment of the invention has been shown and described modifications may be made and it is intended in the appended claims to cover all such modifications as may fall within the true spirit and scope of the invention.

I claim:

1. A subscription television system comprising: a video signal translating device including a target electrode having at least two separate and distinct scanning areas, means for developing at least one cathode-ray beam within said device and for directing said beam to said target, deflection means for scanning said beam over said target, and control elements responsive to an applied signal to effect successive scansion of said areas by said beam; an optical system for defining a first image path between a reference point and one of said scanning areas and for defining a second image path between said reference point and the other of said scanning areas; a fixed optical inverter included in one of said paths for inverting the image projected on one of the scanning areas as compared with the image projected on the other of the scanning areas, so that image translation from said reference point to said areas is in two mutually incompatible modes; and coding apparatus coupled to said control elements for supplying an actuating signal thereto, causing said beam to be scanned over one of the scanning areas during selected operating intervals and over the other of the scanning areas during interposed operating intervals, in accordance with a random code schedule established by the actuating signal.

2. A subscription television system comprising: a video-signal translating device including, a target electrode having sensitized faces inclined to the plane of said target and so aligned as to form at least two separate and distinct scanning areas, means for developing at least one cathode-ray beam within said device and for directing said beam to said target, and control elements responsive to an applied signal to effect successive scansion of said areas by said cathode-ray beam; an optical system for defining a first image path between a reference point and one of said scanning areas and for defining a second image path between said reference point and the other of said scanning areas; a fixed optical inverter included in one of said paths for inverting the image projected on one of the scanning areas as compared with the image projected on the other of the scanning areas, so that image translation from said reference point to said areas is in two mutually incompatible modes; and coding apparatus coupled to said control elements for supplying an actuating signal thereto causing said beam to be scanned over one of the scanning areas during selected operating intervals and over the other of the scanning areas during interposed operating intervals, in accordance with a random code schedule established by the actuating signal.

3. A subscription television system comprising: a video-signal translating device including, a target electrode having sensitized faces inclined to the plane of said target and so aligned as to form two separate and distinct scanning areas, means for developing a cathode-ray beam within said device and for directing said beam to said target, deflection means for scanning said beam over said target, and further deflection elements responsive to an applied signal for controlling the trajectory of said beam to effect successive scansion of said areas thereby; an optical system for defining a first image path between a reference point and one of said scanning areas and for defining a second image path between said reference point and the other of said scanning areas; a fixed optical inverter included in one of said paths for inverting the image projected on one of the scanning areas as compared with the image projected on the other of the scanning areas, so that image translation from said reference point to said areas is in two mutually incompatible modes; and coding apparatus coupled to said further deflection elements for supplying an actuating signal thereto causing said beam to be scanned over one of the scanning areas during selected operating intervals and over the other of the scanning areas during interposed operating intervals, in accordance with a random code schedule established by the actuating signal.

NATHAN W. ARAM.

REFERENCES CITED

The following references are of record in the file of this patent:

UNITED STATES PATENTS

| Number | Name | Date |
|---|---|---|
| 2,107,464 | Zworykin | Feb. 8, 1938 |
| 2,118,160 | Cawley | May 24, 1938 |
| 2,337,980 | Dumont et al. | Dec. 28, 1943 |
| 2,481,839 | Goldsmith | Sept. 13, 1949 |
| 2,521,010 | Homrighous | Sept. 5, 1950 |
| 2,531,974 | Ellett | Nov. 28, 1950 |
| 2,543,793 | Marks | Mar. 6, 1951 |